UNITED STATES PATENT OFFICE.

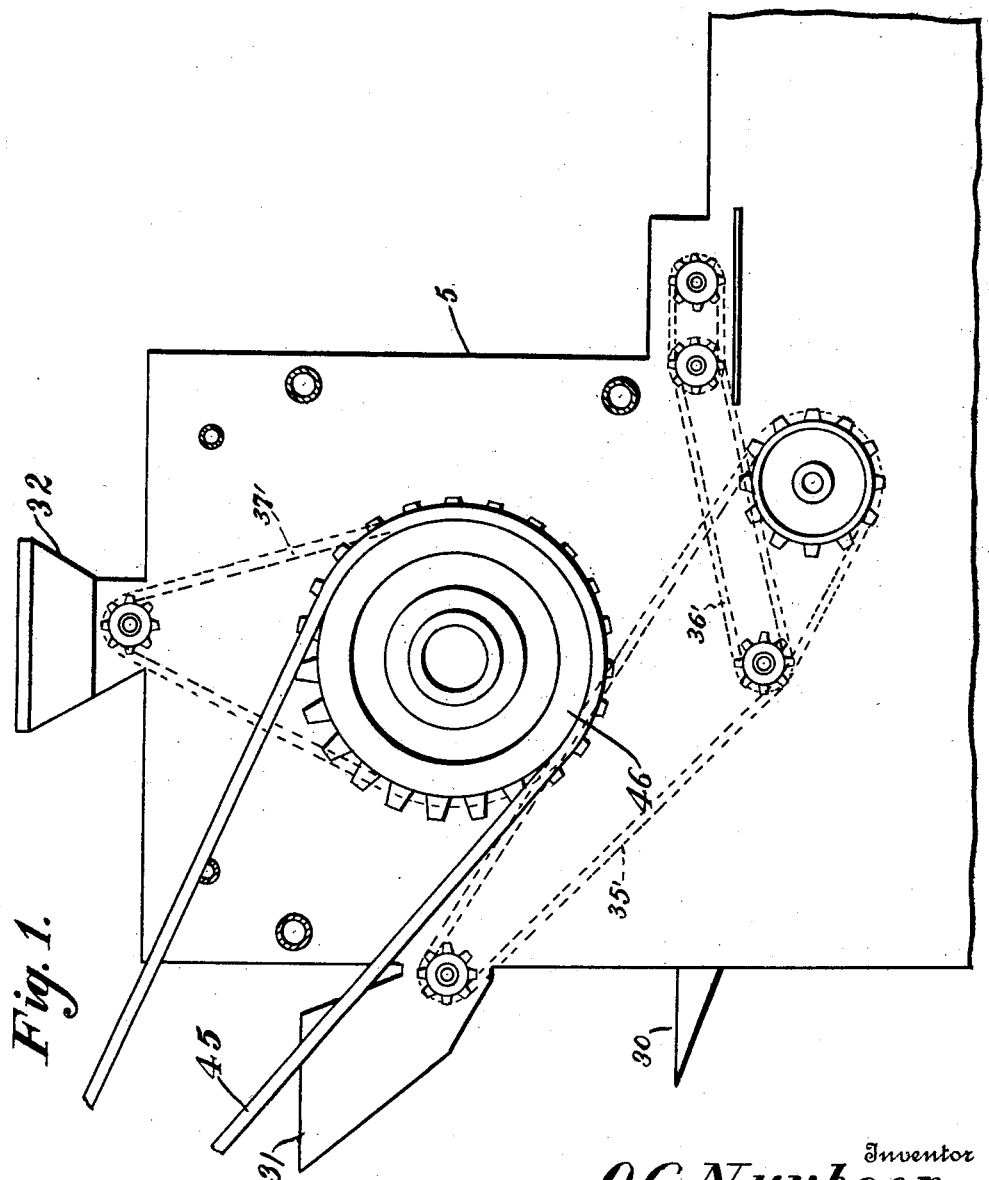

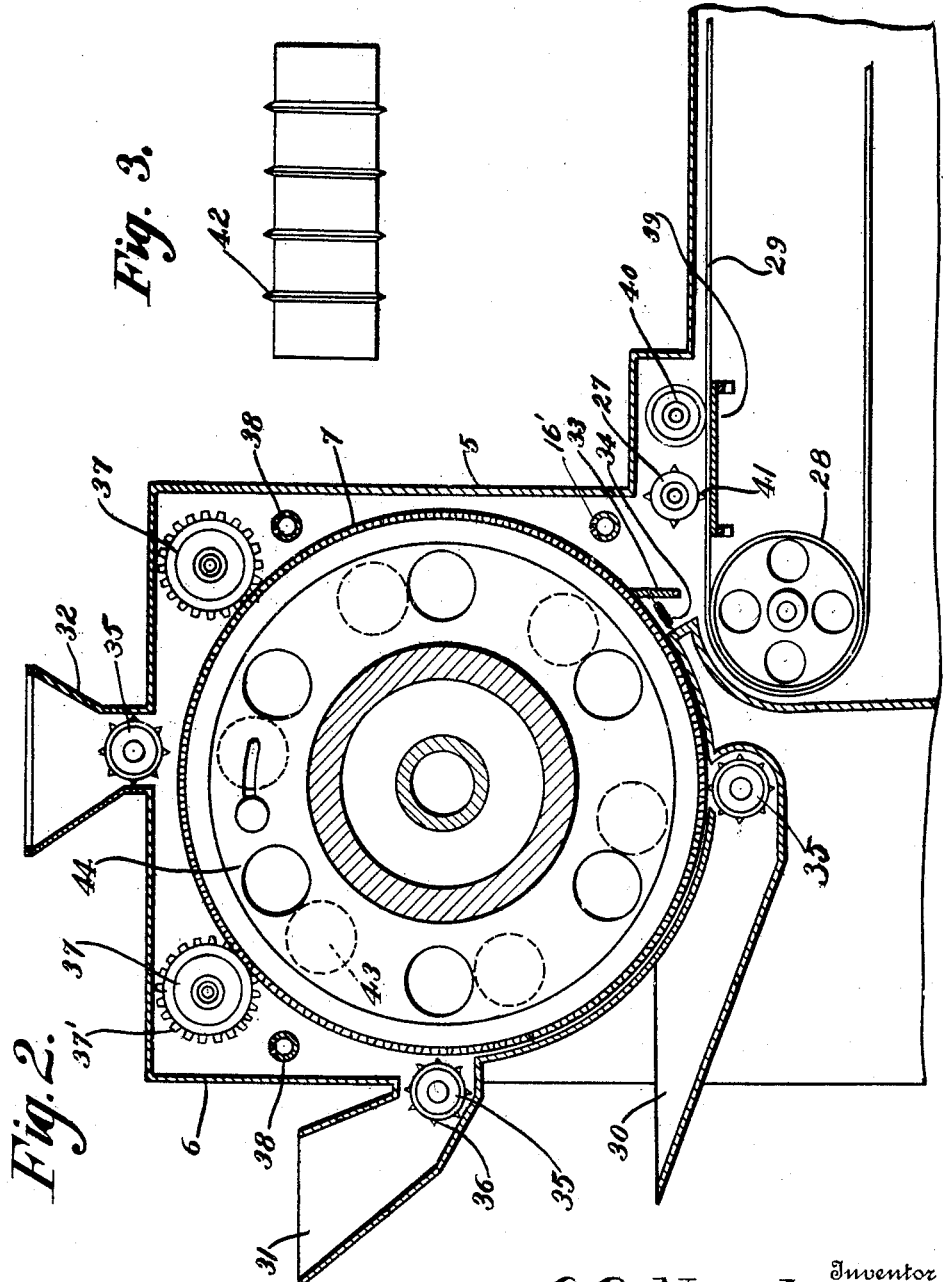

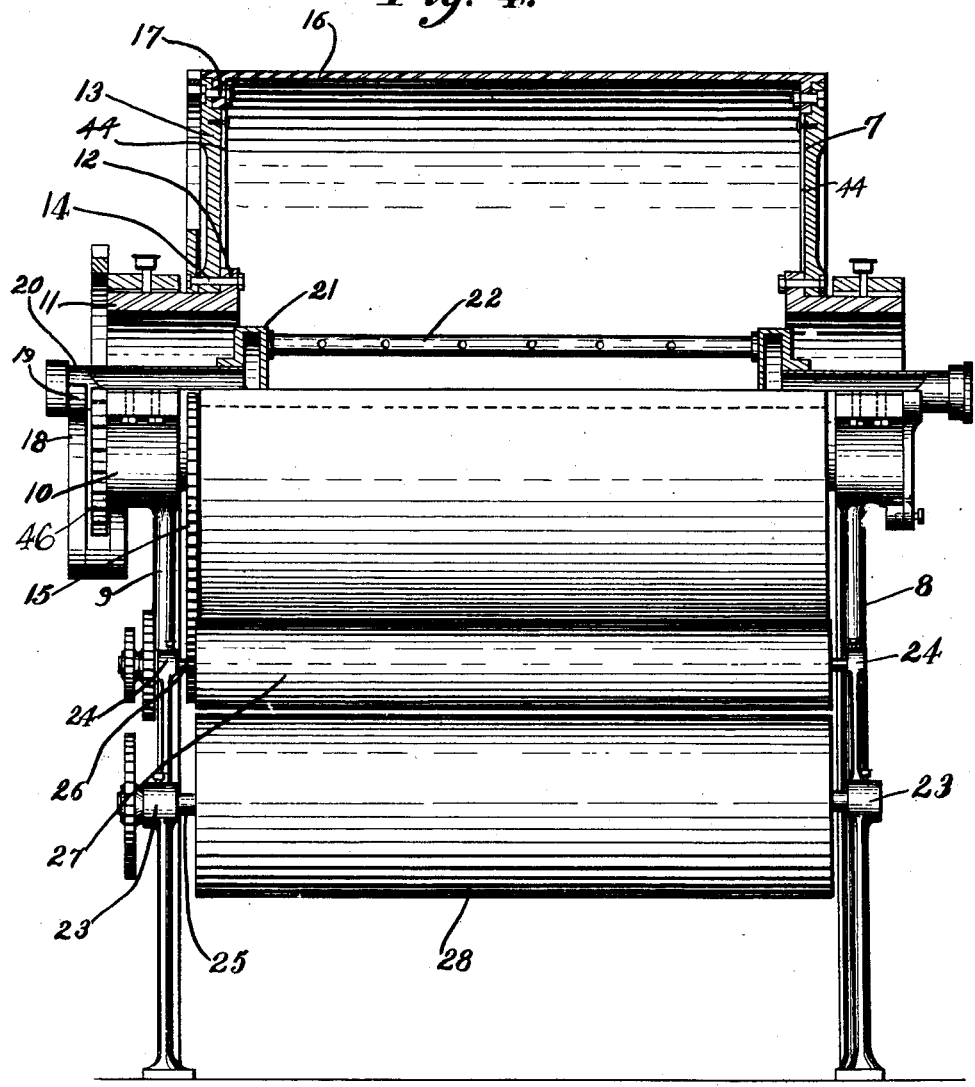

OLE C. NUUBSON, OF DULUTH, MINNESOTA.

OVEN.

1,399,149.  Specification of Letters Patent.  Patented Dec. 6, 1921.

Application filed July 27, 1920. Serial No. 399,339.

*To all whom it may concern:*

Be it known that I, OLE C. NUUBSON, a subject of the King of Norway, residing at Duluth, in the county of St. Louis and State of Minnesota, have invented a new and useful Oven, of which the following is a specification.

The present invention relates to ovens, and more particularly to ovens especially designed for baking pastry such as small cakes or the like, but it is to be understood that slight changes in the specific construction may be made to adapt the device for use for baking other articles, without departing from the spirit of the invention.

The primary object of the invention is to provide an oven wherein the batter or dough of which the cakes are being made, is fed from suitable hoppers onto a revolving heated surface, from where the same passes to suitable conveyers for conveying the articles baked on the heated surface, to suitable driers.

A further object of the invention is to provide an oven which will be purely automatic in its operation, and one which may be operated by a single person, whose duties would be to fill the feeding hoppers with the dough or batter, thus reducing the number of employees, to a minimum.

Referring to the drawings:—

Figure 1 illustrates a side elevational view of an oven constructed in accordance with the present invention.

Fig. 2 illustrates a longitudinal sectional view through a portion of the oven.

Fig. 3 illustrates a detail view of one of the cutting rolls, and

Fig. 4 illustrates a rear elevational view partly in section showing the outer casing of the oven as removed.

Referring to the drawings in detail, the oven includes an outer casing indicated at 5 which houses substantially the entire oven structures, to retain the heat and insure the efficient baking of the material placed therein.

As shown, this casing includes a relatively large end portion 6 which is in the form of a housing that houses the main or rotary oven indicated at 7, the oven 7 being of a diameter so that the periphery thereof operates in spaced relation with the inner walls of the housing or end portion 6.

Disposed within the end portion 6, is a frame which includes end sections 8 and 9 supported in suitable spaced relation with each other, each of which sections is provided with a bearing member 10 adapted to accommodate the hollow shafts 11, which support the rotary oven 7, the shafts 11 having flanges 12 which are bolted to the end sections 13 of the oven 7 by means of the bolts 14, that are shown as passing through suitable openings in the flanges and end sections 13, the bolts at one end of the oven 7 being of lengths to extend through the pinion 15, to secure the sprocket wheel to the drum.

The oven 7 also includes a tubular member 16 which is bolted to the end sections 13 by means of the bolts 17, so that movement of the end sections imparts a rotary movement to the member 16 and oven proper. Associated with the bearing members 10 are the brackets 18, which are secured to the bearing members and have the upper ends thereof concaved as at 19 to accommodate the gas pipes 20, which extend through the hollow shafts 11, and have their inner extremities in communication with the heads 21, that supply gas to the burner pipes 22, for heating the interior of the oven 7.

Bearing members 23 and 24 are provided on each of the end sections 8 and 9, and accommodate the shafts 25 and 26 respectively, the shaft 26 supporting a suitable cutting roll indicated at 27, while the shaft 26 supports the conveyer roll 28, over which operates a conveyer 29 for carrying the articles baked on the rotary oven 7 to a suitable drying means not shown.

Hoppers indicated at 30, 31 and 32 have communication with the interior of the housing 6, and have their discharge ends disposed in close proximity to the rotary oven 7 so that the material fed from the hoppers 31 and 32 will come in direct contact with the periphery of the oven 7, where portions thereof will be collected by the oven and carried to a point where the same is removed therefrom, by means of the scraper 33, which is pivotally supported between the side walls of the housing and held into engagement with the oven 7 by means of the coiled spring 34.

Disposed in the discharge end of each of the hoppers is a distributing roll 35, which is caused to revolve by any suitable means, and as shown, these rolls 35 carry distributing blades 36 by means of which the dough fed from the hoppers may be evenly distributed on the surface of the oven 7.

Operating adjacent the upper portion of the housing 6, are the rolls 37, which have their peripheries disposed in close proximity to the surface of the oven 7, the rolls being disposed in spaced relation with the surface of the oven 7, certain rolls being a greater distance from the oven 7 than the remaining rolls, so that the material deposited on the oven 7 will be spread to a proper thickness. The rolls 35 and 37 are operated by means of the endless chains 35′, 36′ and 37′, all of which operate over suitable sprocket wheels controlled by the sprocket 46. The rolls 37 are heated by the medium of the burners 38 disposed under the rolls.

A table indicated at 39 is disposed directly under the cutting rolls 27 and 40, the cutting roll 27 having longitudinal ribs 41 to cut the baked material into relatively long strips, which strips are severed transversely, by the roll 40, which is provided with the circumferential cutting ribs 42 from where the material, which is now in the form of cakes, are carried off to the drying means.

In each of the end sections 13 are a plurality of openings 43 which are adapted to register with suitable openings provided in the disk 44, which openings when in registry provide means to permit excessive heat of the oven to pass therefrom, to cool the oven.

In the operation of the device, dough or batter is fed to the oven 7 through the hoppers, the oven of course being heated to a predetermined temperature, and by means of the burner 16′. The oven 7 is now caused to revolve at a predetermined speed, through the medium of the chain 45 which operates over the sprocket 46 carried by one end of the shaft 11.

When the material deposited on the oven 7, has reached the scraping member 33, the same has become baked the scraping member removes the material from the oven, from where the same passes to a suitable drying means as before stated. It might be further stated that the pinion 15 meshes with the pinions 37′ to cause the rotation of the rolls 37.

It is believed that in view of the foregoing description, a further detail description of the operation of the device is unnecessary.

What is claimed as new is:—

1. In an oven, an outer casing, said casing having a housing formed at one end thereof, a rotary oven supported within the housing, means disposed within the rotary oven for heating the same, means for regulating the temperature within the rotary oven, means for rotating the rotary oven, a plurality of hoppers having communication with the interior of the housing, and disposed in spaced relation with each other, a feeding roll associated with each hopper for feeding material to the oven, means for removing material from the oven, and means for conveying the material to a point remote from the oven.

2. In an oven, an outer casing, a housing formed at one end of the casing, and forming a part thereof, a rotary drum disposed within the housing, means for regulating the temperature within the oven, hoppers disposed in coöperative relation with the rotary oven, feeding rolls operating within the hoppers, the feeding rolls operating in spaced relation with the surface of the oven, the distance between the feeding rolls and surface of the oven, varying to cause material to be fed to the oven in layers, means for removing materials from the oven, and means for conveying the material therefrom.

In testimony that I claim the foregoing as my own, I have hereto affixed my signature in the presence of two witnesses.

OLE C. NUUBSON.

Witneses:
KATHRYNE STEIN,
H. F. HORNER.